United States Patent [19]

Shinyagaito et al.

[11] Patent Number: 4,695,904
[45] Date of Patent: Sep. 22, 1987

[54] INFORMATION SIGNAL RECORDING DISC RECORDED WITH AN END SIGNAL FOR SELECTIVELY PREVENTING UNWANTED ACCESS TO PREDETERMINED RECORDED INFORMATION AND DISC REPRODUCING APPARATUS THEREFOR

[75] Inventors: Tatsuya Shinyagaito; Terumasa Kuramoto, both of Iwai; Toyotaka Machida; Kikuji Saito, both of Kashiwa; Shunichi Shichijo, Sagamihara; Tooru Yamagishi, Tokyo; Yoshinao Kobayashi, Machida; Kazuyoshi Ishii, Sagamihara; Atsumi Hirata, Fujisawa, all of Japan

[73] Assignee: Victor Company of Japan, Ltd., Japan

[21] Appl. No.: 728,308

[22] Filed: Apr. 29, 1985

[30] Foreign Application Priority Data

May 1, 1984 [JP] Japan .................................. 59-88103

[51] Int. Cl.⁴ .............................................. G11B 7/00
[52] U.S. Cl. .................................... 358/342; 360/10.2; 360/72.2; 360/72.1; 369/33; 369/50; 369/57
[58] Field of Search ........................ 358/335, 342, 907; 360/10.2, 69, 78, 72.1, 72.2; 369/32, 43, 44, 47, 50, 53, 54, 57

[56] References Cited

U.S. PATENT DOCUMENTS 4,488,184 12/1984 Kurata ............................. 358/907 X Primary Examiner—Robert L. Richardson
Attorney, Agent, or Firm—Andrus, Sceales, Starke & Sawall

[57] ABSTRACT

An information signal recording disc comprises a first recorded region in which an information signal at least including a video signal is recorded, and a second recorded region in which an end signal is intermittently recorded. The end signal is used to forcibly and automatically return a reproducing element of a disc reproducing apparatus from a playing position to a rest position. The second recorded region is provided at a position prior to the first recorded region in a direction of a reproducing sequence of the recorded signals on the information signal recording disc. The disc reproducing apparatus comprises a detecting circuit for detecting the reproduced end signal, and a controller. The controller controls the detecting circuit so that the detecting circuit is made substantially inoperative in a state where the disc reproducing apparatus is coupled to an external device having a discriminating function.

11 Claims, 12 Drawing Figures

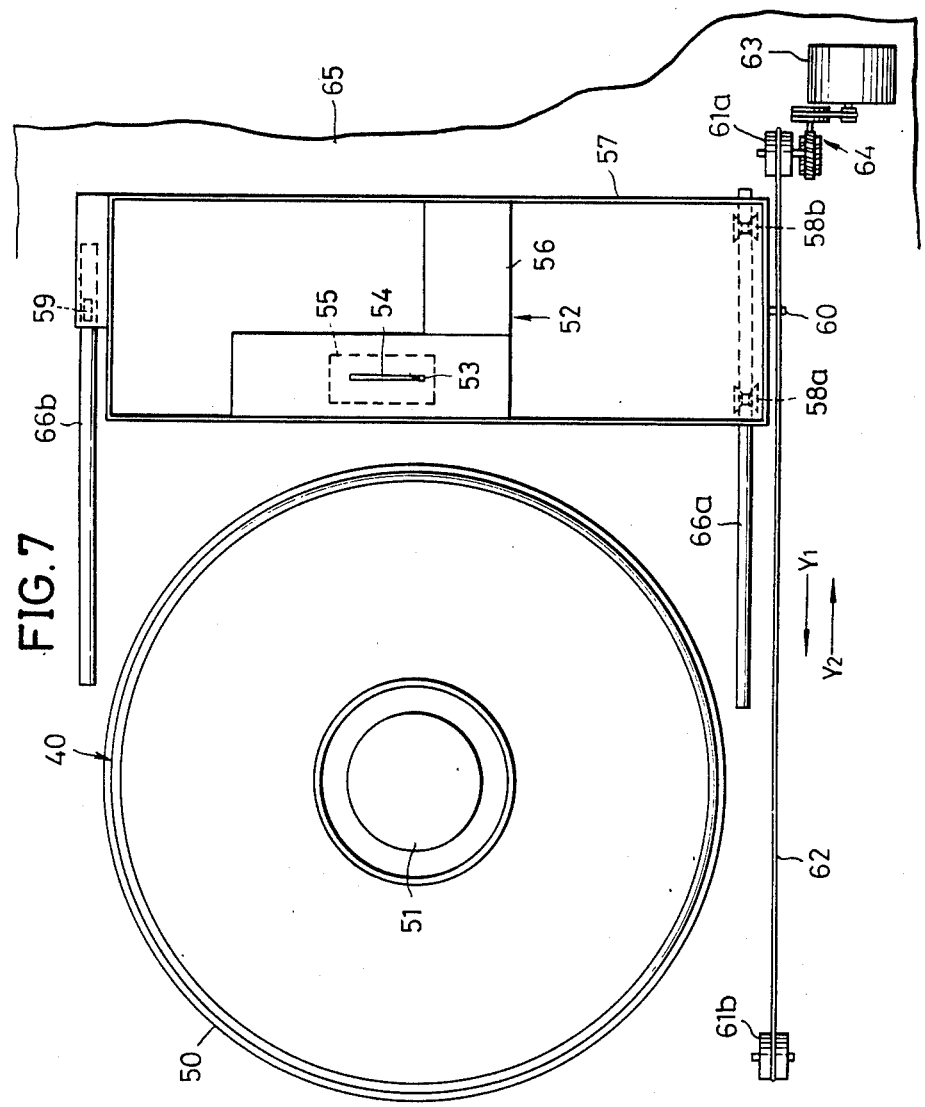

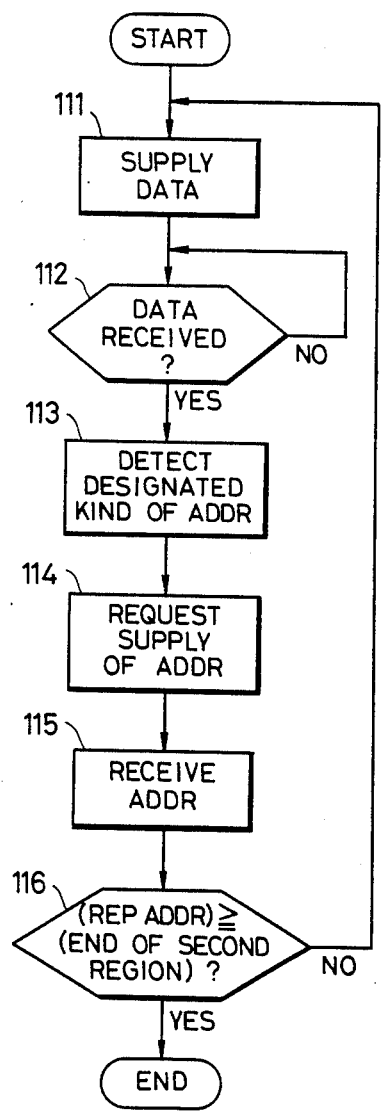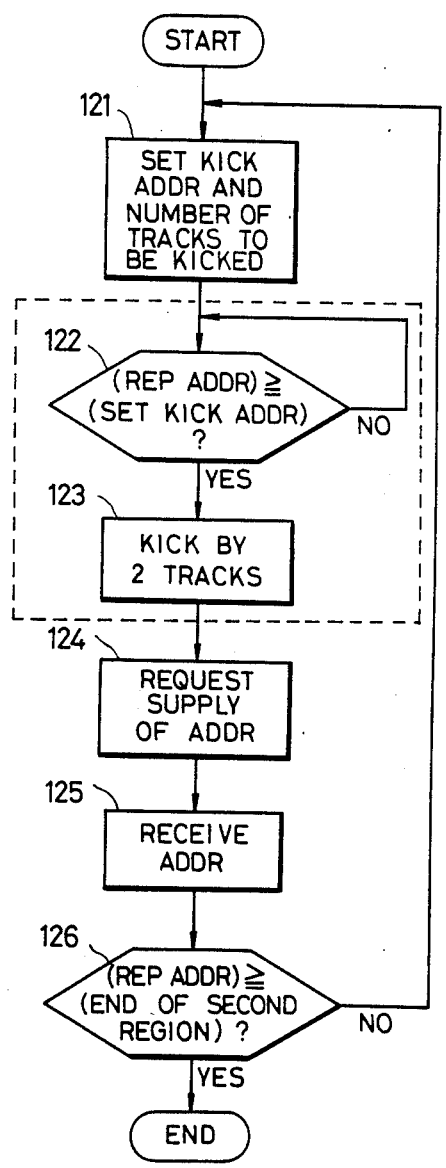

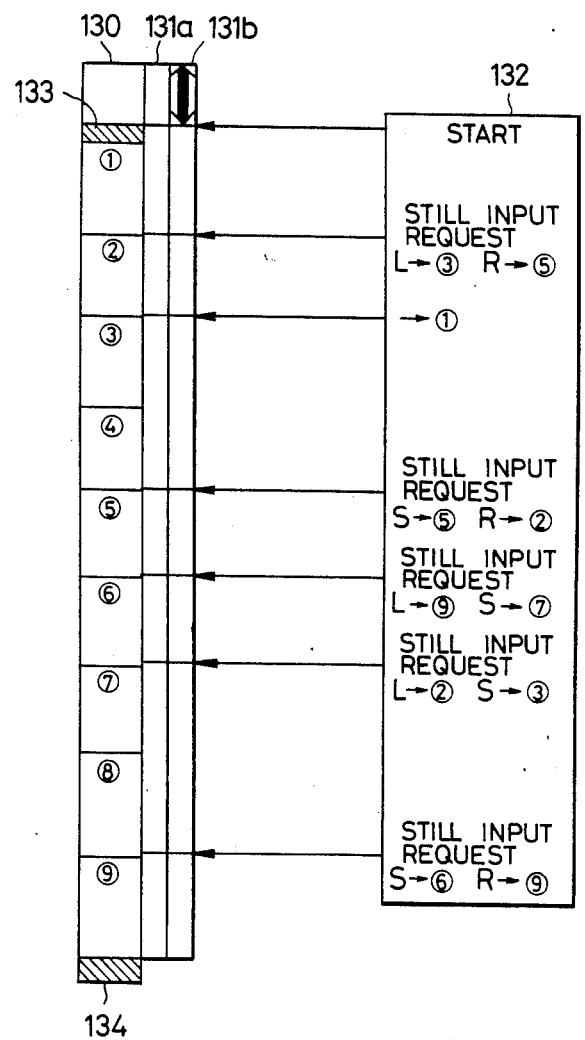

INFORMATION SIGNAL RECORDING DISC RECORDED WITH AN END SIGNAL FOR SELECTIVELY PREVENTING UNWANTED ACCESS TO PREDETERMINED RECORDED INFORMATION AND DISC REPRODUCING APPARATUS THEREFOR

BACKGROUND OF THE INVENTION

The present invention generally relates to information signal recording discs recorded with information signals and a disc reproducing apparatuses therefor, and more particularly to an information signal recording disc which is recorded at predetermined positions thereof with an end signal for forcibly and automatically returning a reproducing element of a disc reproducing apparatus from a playing position to a rest position, and a disc reproducing apparatus for playing such an information recording disc.

Heretofore, attempts have been made to more effectively utilize information signals which are recorded on an information signal recording disc (hereinafter simply referred to as a disc). Such attempts include coupling to a disc reproducing apparatus an external device such as a microcomputer which has a discriminating function, for example, and controlling the disc reproducing apparatus by the external device. The control of the disc reproducing apparatus by the external device is carried out based on a control program which is recorded on the disc together with the information signals such as video and audio signals. As a result, it is possible to play the disc on the disc reproducing apparatus in the so-called interactive mode between the external device.

A signal recording system for recording the control program described above and a disc which is recorded with the control programs, are disclosed in a U.S. patent application Ser. No. 574,521 filed Jan. 27, 1984 in which the assignee is the same as the assignee of the present application. According to this previously proposed signal recording system, a modulated signal is obtained by modulating digital data related to the control program according to a self clock modulation system, such as the biphase space modulation system and the biphase mark modulation system, based on a reference clock having a period which is twice the horizontal scanning period of the video signal, for example. The modulated signal is then band-limited to the audio signal band, and is recorded independently on the disc or is multiplexed in time sequence with the audio signal and recorded on the disc.

On the other hand, a disc reproducing apparatus for playing the previously proposed disc described above, is disclosed in a U.S. patent application Ser. No. 574,520 filed Jan. 27, 1984 in which the assignee is the same as the assignee of the present application.

According to the previously proposed disc and disc reproducing apparatus, it is possible to simultaneously reproduce the video and audio signals, and the control program signal can also be reproduced from the track which is recorded with the video and audio signals. Accordingly, by successively processing the control program signal reproduced from the disc, it is possible to play the disc on the disc reproducing apparatus in the interactive mode between the external device.

However, the majority of the existing disc reproducing apparatuses are provided with functions such as high-speed reproduction and random search. The disc reproducing apparatus having the random search function, for example, is useful in that the operator may quickly search and find the information which is recorded at an arbitrary track position on the disc by carrying out the search with an arbitrary timing. But, when the random search is carried out when playing the disc which is recorded with the control program, the disc will be played in a manner which was not originally intended by the developer of the software who developed the control program, and the value of the program recorded on the disc will be lost. For example, in the case of a disc for use in a game in which the scene advances as the player (operator) increases his score, it will become possible for the player to see the scenes which will appear near the end of the game by carrying out the high-speed reproduction or random access, although the scenes which will appear near the end of the game should only be obtained depending on the skill and luck of the player. When anybody can easily see the scenes which will appear near the end of the game by carrying out the high-speed search or random access, without actually playing the game, there is a problem in that the player will lose interest in the game and the game will no longer be challenging and fun for the player.

SUMMARY OF THE INVENTION

Accordingly, it is a general object of the present invention to provide a disc and a disc reproducing apparatus therefor, in which the problems described heretofore are eliminated.

Another and more specific object of the present invention is to provide a disc comprising at least one information signal recorded region in which information signals are recorded, and an end signal recorded region provided prior to the information signal recorded region in the direction of the reproducing sequence of the recorded signals. An end signal for forcibly and automatically returning a reproducing element of a reproducing apparatus from a playing position to a rest position, is recorded at predetermined positions within the end signal recorded region. When the disc according to the present invention is played on the disc reproducing apparatus which is not coupled to an external device such as a microcomputer having a discriminating function, the reproducing element of the disc reproducing apparatus will always reproduce the end signal recorded within the end signal recorded region and the reproducing element will be forcibly and automatically returned to the rest position so as to positively prevent the reproduction of the information signals recorded within the information signal recorded region.

Still another object of the present invention is to provide a disc reproducing apparatus comprising a reproducing element for reproducing signals from a disc which comprises the above information signal recorded region and the end signal recorded region, a moving mechanism for moving the reproducing element between the rest position and the playing position, a detecting circuit for detecting the end signal from the signal reproduced by the reproducing element, an interface circuit for at least supplying data within the reproduced signal to the external device and for receiving a control command from the external device, and a controller for controlling the operation of the detecting circuit based on the control command from the interface circuit and for controlling the moving mechansim based on the end signal detected in the detecting circuit.

In a state where the disc reproducing apparatus according to the present invention is coupled to the external device, the controller makes the detecting circuit substantially inoperative based on the control command, and the reproducing element passes through the end signal recorded region substantially without reproducing the end signal. On the other hand, in a state where the disc reproducing apparatus according to the present invention is not coupled to the external device, the controller makes the detecting circuit operative so that the detecting circuit can detect the end signal reproduced from the end signal recorded region, and the reproducing element is forcibly and automatically returned to the rest position when the end signal is reproduced from the end signal recorded region. Accordingly, the reproduction of the signals recorded within the information signal recorded region is positively prevented in the state where the disc reproducing apparatus according to the present invention is not coupled to the external device.

Other objects and further features of the present invention will be apparent from the following detailed description when read in conjunction with the accompanying drawings.

BRIEF DESCRIPTION OF THE DRAWINGS

FIG. 7 is a plan view showing an example of general mechanisms of the disc reproducing apparatus according to the present invention;

FIGS. 9 and 10 are flow charts for explaining the operations of the disc reproducing apparatus and an external device when playing the discs shown in FIGS. 4 and 5, respectively;

FIG. 12 is a diagram for explaining the disc recorded with the game program of FIG. 11 and the operation of the disc reproducing apparatus when playing the disc.

DETAILED DESCRIPTION

Figure 1:
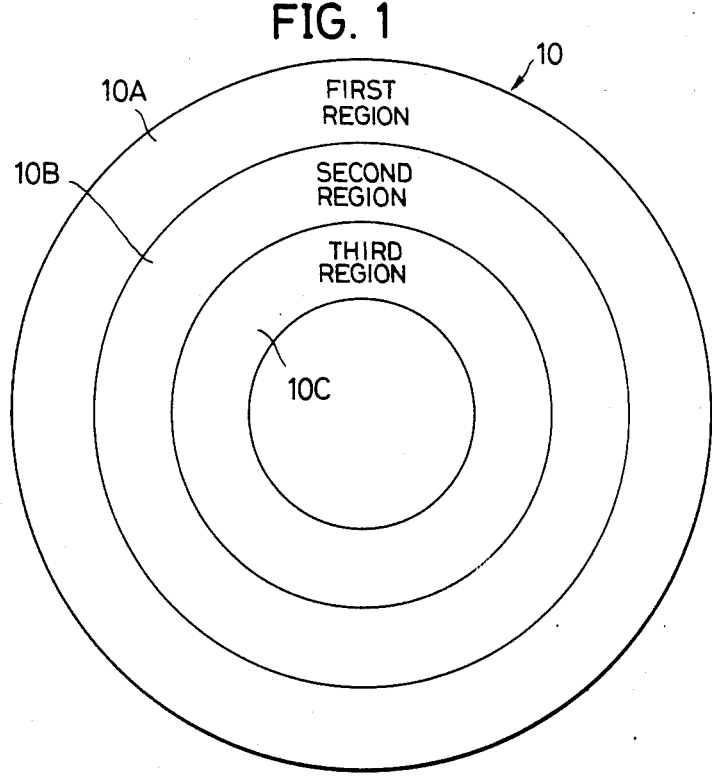
FIG. 1 shows a first embodiment of the disc according to the present invention for explaining recorded regions on the disc.

FIG. 1 shows a first embodiment of the disc according to the present invention. For convenience's sake, it will be assumed that the disc 10 comprises a first recorded region 10A, a second recorded region 10B, and a third recorded region 10C. An information signal at least including a video signal, a control program and the like are recorded in each of the first through third regions 10A through 10C. The control program includes control commands of a disc reproducing apparatus which plays the disc 10, and input and output commands and internal processing commands of an external device such as a microcomputer which has a discriminating function and is coupled to the disc reproducing apparatus.

In the present embodiment, it will be assumed that the disc 10 is recorded with data related to a game in which the scene advances as the player increases his score. For example, in the case of a game in which the player must go through a maze, the player selects the course he wishes to take every time a fork in the maze is reached. The data related to the possible courses are all recorded within the third region 10C, for example, and the data in accordance with the course selected by the player is reproduced from the third region 10C and is displayed on a monitor. However, when anybody can easily make access to the data recorded in the third region 10C by carrying out a high-speed reproduction or a random access operation, the correct course to be selected at each of the forks in the maze will become known, and the game will no longer be challenging and fun to play.

Accordingly, in the present invention, an end signal is recorded at predetermined positions within the second region 10B of the disc 10 so as to prevent access to the data recorded within the third region 10C by the high-speed reproduction and the random access operation. As will be described later on in the specification, the disc reproducing apparatus is designed so as to forcibly and automatically return a reproducing element thereof from a playing position to a rest position when the end signal is reproduced from the disc 10. Hence, when a high-speed reproduction or a random access operation is carried out while playing the disc 10 on the disc reproducing apparatus, it is possible to reproduce the data recorded within the first region 10A, but the end signal will always be reproduced when the reproducing element starts to scan over the second region 10B. For this reason, the reproducing element will be returned to the rest position, and the data recorded within the third region 10C will not be reproduced. That is, when an attempt is made to reproduce the data recorded within the third region 10C of the disc 10 by simply carrying out the high-speed reproduction or the random access operation on the disc reproducing apparatus which is not coupled to the external device such as the microcomputer, the reproducing element will always reproduce the end signal within the second region 10B, and it is impossible to pass the second region 10B and reach the third region 10C without reproducing the end signal recorded within the second region 10B.

On the other hand, when playing the disc 10 on the disc reproducing apparatus which is coupled to the external device such as the microcomputer (that is, when playing the game), data related to the existing range of the second region 10B on the disc 10 and data related to the predetermined positions on the disc 10 where the end signal is recorded, are reproduced from the disc 10 and are stored within the external device. Thus, the scanning locus of the reproducing element is controlled based on the data stored within the external device so as not to reproduce the end signal recorded within the second region 10B. In this case, it is possible to pass the second region 10B without reproducing the end signal and reach the third region 10C. Accordingly, the reproducing element can scan over the third region 10C and reproduce the data related to the course which is selected by the player.

The end signal may be recorded regularly or at random within the second region 10B of the disc 10. The end signal simply needs to be recorded within the second region 10B in such a manner that the end signal will always be reproduced within the second region 10B when the disc 10 is played on the disc reproducing apparatus which is not coupled to the external device, that is, when playing the game in the case of the present embodiment. Further, when there exists on the disc a plurality of regions containing data which should not be easily accessible as in the case of the third region 10C, a region containing the end signal as in the case of the second region 10B can be provided prior to each of the above regions containing the data in the direction of the reproducing sequence of the recorded signals. In this case, the number of regions containing the end signal is equal to the number of regions containing the data.

Next, a description will be given with respect to a second embodiment of the disc according to the present invention.

The disc previously proposed in the U.S. patent application Ser. No. 574,521 described before, is recorded with a control program together with information signals such as a video signal. Further, three kinds of address signals for indicating the position on the disc, are recorded within each part of the disc corresponding to the vertical blanking period of the video signal. The three kinds of address signals comprise a chapter address signal for indicating the position on the disc in terms of the order of recorded programs, a time address signal for indicating the position on the disc in terms of the reproducing time it takes to reach the position when the disc is played in a normal reproduction mode, and a track number address signal (hereinafter simply referred to as a page address signal) for indicating the position on the disc in terms of the number of track turns. The normal reproduction mode is a mode in which the the reproduction is carried out in a state where the disc is rotated at a speed which is the same as the speed with which the recording was carried out. In the present embodiment, the end signal is recorded in place of one or two kinds of address signals out of the three kinds of address signals, at predetermined positions within the second region 10B.

Figure 2:
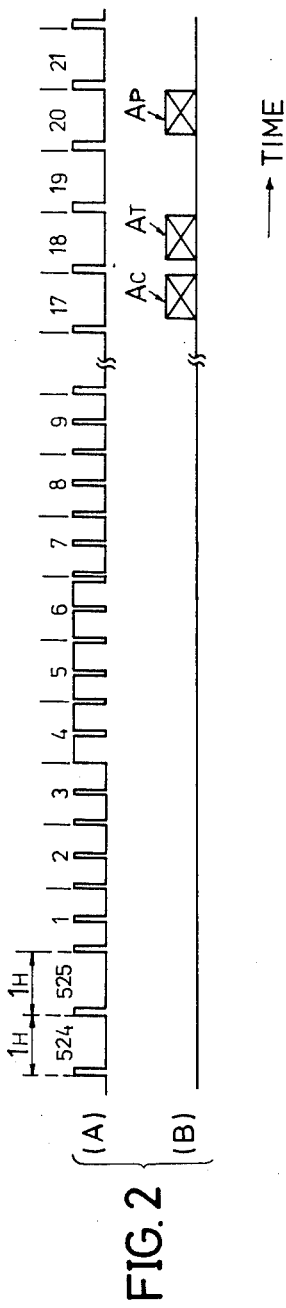
FIGS. 2(A) and 2(B) are diagrams for explaining recorded positions of address signals.

A description will now be given with respect to the address signals. For example, when it is assumed that the address signals are recorded on the disc together with an NTSC system television signal, the signal waveform of a composite synchronizing signal of the television signal in the vicinity of the vertical blanking period becomes as shown in FIG. 2(A). In FIG. 2(A), the numbers indicated above the waveform represent the scanning line number, and one horizontal scanning period is represented by 1H. As shown in FIG. 2(B), a chapter address signal $A_C$, a time address signal $A_T$, and a page address signal $A_P$ are each recorded within the time period of 1H at the respective scanning line numbers 17, 18, and 20 (or scanning line numbers 280, 281, and 283), respectively.

Figure 3:
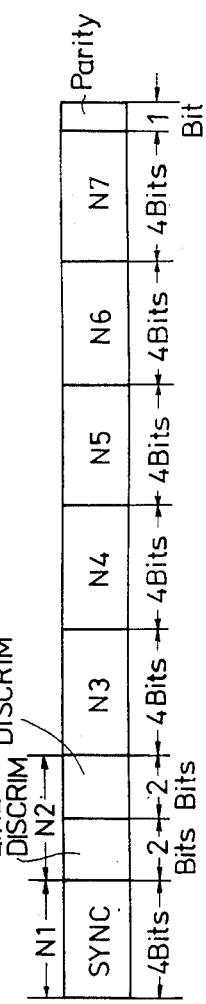
FIG. 3 shows an example of a signal format at the address signals.

FIG. 3 shows an example of a signal format of the address signals. A synchronizing signal SYNC having a fixed pattern (for example, a value "C" in hexadecimal) is arranged within the first four bits N1. A line discrimination code is arranged in the next two bits N2, and an audio discrimination code is arranged in the two bits N3 next to the bits N2. The line discrimination code is provided to discriminate the scanning line number at which the address signal is transmitted. The audio discrimination code is provided to discriminate the kind of the recorded audio signal (for example, stereo, monaural, bilingual and the like). The address data is arranged in the twenty bits next to the bits N2. The remaining one bit is the parity bit. In FIG. 3, the twenty bits from the ninth to the twenty-eighth bits of the address data are represented by four bits N3, N4, N5, N6, and N7. The address data of the address signal $A_C$, $A_T$, or $A_P$ is arranged within the bits N3 through N7.

The end signal which is recorded in the present embodiment, has a signal format which is the same as the signal format of the address signals $A_C$, $A_T$, and $A_P$ shown in FIG. 3. The end signal is recorded in place of one or two kinds of address signals out of the three kinds of address signals $A_C$, $A_T$, and $A_P$, at the corresponding scanning line numbers 17, 18 and 20, 280, 281, and 283. The end signal which is recorded in place of the chapter address signal $A_C$ contains approximately the same content as the chapter address signal $A_C$, but the bits N3 and N4 shown in FIG. 3 contain the hexadecimal value "EE". On the other hand, the end signal which is recorded in place of the time address signal $A_T$ or the page address signal $A_P$ contains approximately the same content as the time address signal $A_T$ or the page address signal $A_P$, but the bits N3 shown in FIG. 3 contain the hexadecimal value "E".

Figure 4:
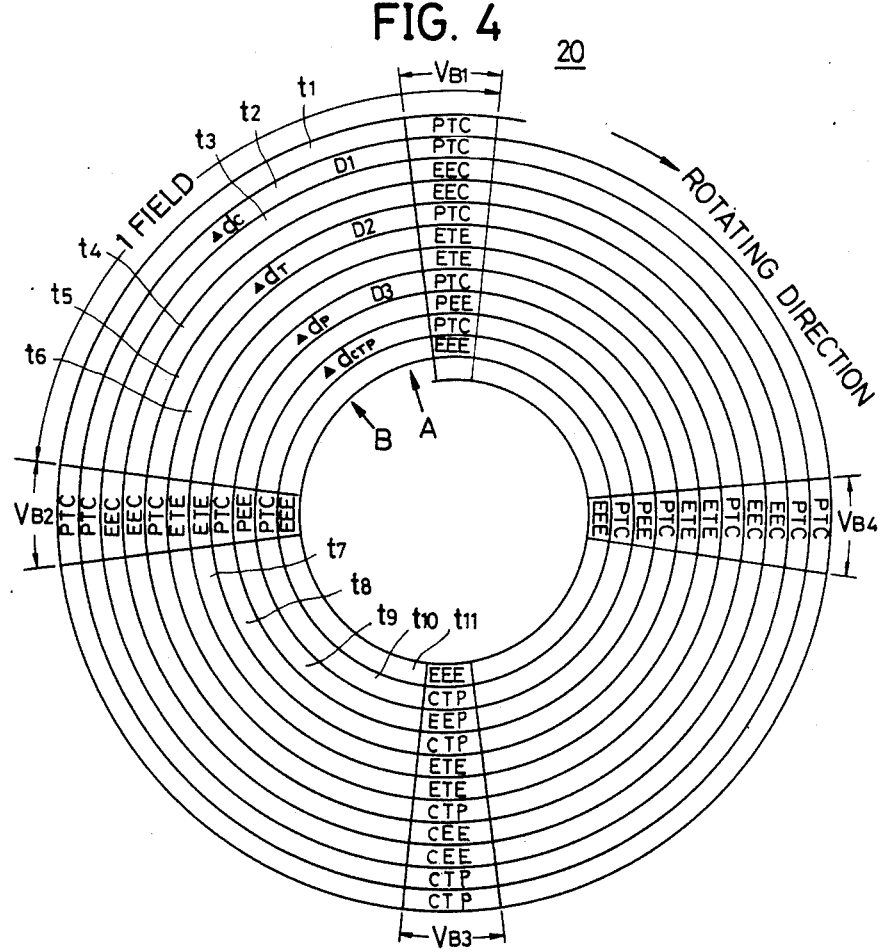
FIG. 4 shows an essential part of a second embodiment of the disc according to the present invention.

In the present embodiment, it will be assumed that the information signal is recorded at the rate of four fields per revolution Q of the disc, for conveniences' sake. However, the information signal may be recorded at a rate of a plurality of fields other than four per revolution of the disc. FIG. 4 shows an essential part of a disc 20 according to the present embodiment, with especially the second region 10B shown on an enlarged scale. In FIG. 4, blanking parts $V_{B1}$ through $V_{B4}$ which correspond to the vertical blanking periods of the video signal and exist at four positions in each of track turns t1 through t11, are shown on an enlarged scale compared to other parts of the disc 20. In each of the blanking parts $V_{B1}$ through $V_{B4}$, the letters "C", "T", "P", and "E" indicate that the chapter address signal $A_C$, the time address signal $A_T$, the page address signal $A_P$, and the end signal is recorded within the blanking part. It will be assumed that each of the track turns t1 through t11 are counted starting from the blanking part $V_{B1}$. Although the disc 20 shown in FIG. 4 comprises a spiral track, it is of course possible to provide a plurality of concentric tracks instead.

In FIG. 4, the track turns t1 and t2 correspond to the track turns within the first region 10A shown in FIG. 1. The three kinds of address signals $A_C$, $A_T$, and $A_P$ are all recorded within each of the blanking periods $V_{B1}$ through $V_{B4}$. Accordingly, while the reproducing element of the disc reproducing apparatus is scaning over the track turns t1 and t2, it is possible to detect one of the three kinds of reproduced address signals as in the conventional case.

The track turns t3 through t9 correspond to the track turns within the second region 10B shown in FIG. 1. In the track turns t3 and t4, the end signal is recorded in place of the time address signal $A_T$ and the page address signal $A_P$. The end signal is recorded in place of the chapter address signal $A_C$ and the page address signal $A_P$ in the track turns t6 and t7. Further, the end signal is recorded in place of the chapter address signal $A_C$ and the time address signal $A_T$ in the track turn t9. In the present embodiment, the track turns t5 and t8 within the second region 10B are not recorded with the end signal, but it is of course possible to record the end signal on each of the track turns within the second region 10B. In addition, in the present embodiment, the end signal is recorded in place of two kinds of address signals out of the three kinds of address signals $A_C$, $A_T$, and $A_P$ in each of the track turns t3, t4, t6, t7, and t9. However, it is also possible to record the end signal in place of only one of the three kinds of address signals $A_C$, $A_T$, and $A_P$.

As will be described later, one kind of address signal out of the three kinds of reproduced address signals $A_C$, $A_T$, and $A_P$ is detected in the disc reproducing apparatus. Accordingly, when the disc reproducing apparatus is set to detect the chapter address signal, for example, in the state where the disc reproducing apparatus is not coupled to the external device, the chapter address signal $A_C$ will be detected when scanning over the track turns t1 and t2 within the first region 10A and when scanning over the track turns t3, t4, and t5 within the second region 10B. However, the end signal will be detected when scanning over the track turn t6 within the second region 10B. As a result, the reproducing element will be returned from the playing position to the rest position before reaching the track turn t10 within the third region 10C. On the other hand, when the disc reproducing apparatus is set to detect the time address signal $A_T$ or the page address signal $A_P$, the time address signal $A_T$ or the page address signal $A_P$ will be detected when scanning over the track turns t1 and t2 within the first region 10A, but the end signal will be detected when scanning over the track turn t3 within the second region 10B. Thus, in this case, the reproducing element will also be returned from the playing position to the rest position before reaching the track turn t10 within the third region 10C.

The operator can manually switch and select the kind of address signal to be detected in the disc reproducing apparatus. However, the operator has no means of knowing the exact positions where the end signal is recorded in place of one or two kinds of address signals. Even if the operator were to somehow obtain knowledge of such positions where the end signal is recorded in place of one or two kinds of address signals, it is impossible to follow the rapid change in the recorded state of the end signal and manually switch the kind of address signal to be detected, since the change occurs in terms of a minimum time of 1/15 seconds when the disc 20 rotates at a rotational speed of 900 rpm, for example.

On the other hand, when playing the disc 10 on the disc reproducing apparatus which is coupled to the external device, the data related to the existing range of the second region 10B on the disc 20 and the data related to the positions on the disc 20 where the end signal is recorded in place of one or two kinds of address signals are reproduced from the disc 20 and are stored within the external device. In this case, it is possible to pass through the second region 10B without detecting the end signal and reach the track turn t10 within the third region 10C, by switching the kind of address signal to be detected based on the data stored within the external device so that the end signal will not be detected within the second region 10B. In the present embodiment, it is possible to continuously reproduce signals from the track turns t3 through t9 and pass through the second region 10B, by switching the kind of address signal to be detected so that the chapter address signal $A_C$ is detected in the track turns t3 through t5, the time address signal $A_T$ is detected in the track turns t6 through t8, and the page address signal is detected in the track turn t9.

As may be understood from the description given heretofore, the end signal will be positively detected regardless of which kind of address signal the disc reproducing apparatus is fixedly set to detect, by recording the end signal in place of each of the three kinds of address signals $A_C$, $A_T$, and $A_P$ at least once within the second region 10B.

The track turn t10 shown in FIG. 4 corresponds to the track turn within the third region 10C shown in FIG. 1. For convenience's sake, the third region 10C only comprises the track turn t10 in the present embodiment. The three kinds of address signals $A_C$, $A_T$, and $A_P$ are all recorded within each of the blanking parts $V_{B1}$ through $V_{B4}$ in the track turn t10, similarly as in the case of the track turns within the first region 10A. The end signal is recorded in place of all of the three kinds of address signal $A_C$, $A_T$, and $A_P$ within each of the blanking parts $V_{B1}$ through $V_{B4}$ in the track turn t11, so as to indicate the end of the recorded range of the disc 20 as in the case of the conventional disc. Accordingly, the end signal will always be detected when scanning over the track turn t11 and the reproducing element will hence be returned from the playing position to the rest position.

The sequence with which the one or two kinds of address signals are to be replaced by the end signal, may be regular or at random.

Figure 5:
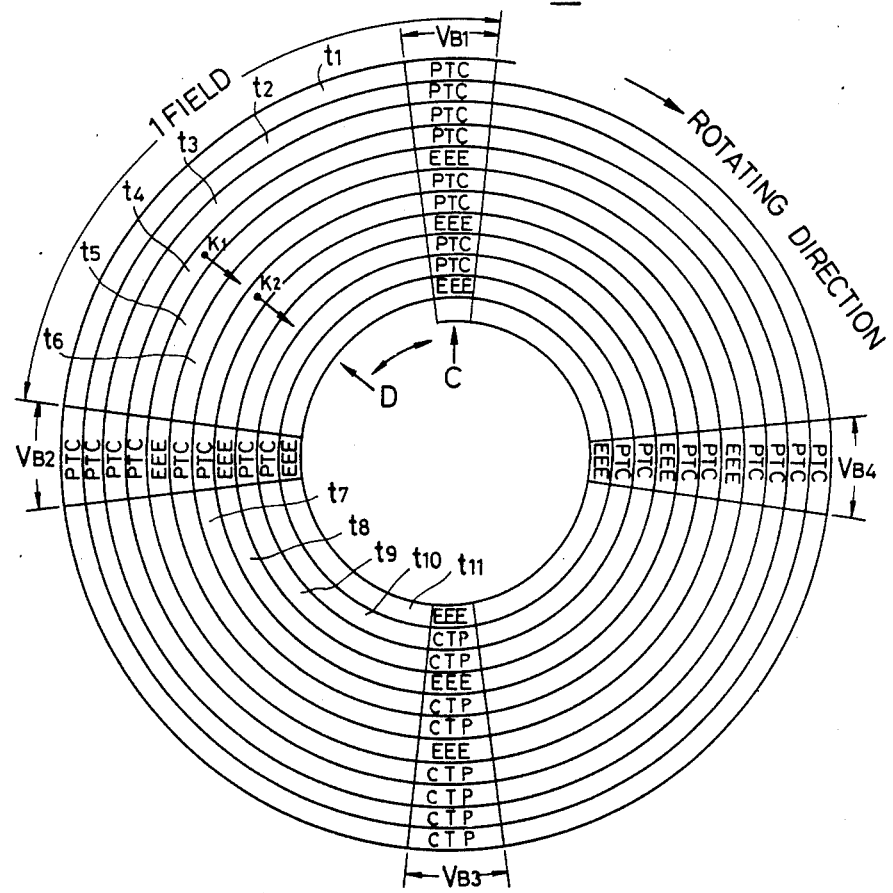
FIG. 5 shows an essential part of a third embodiment of the disc according to the present invention.

FIG. 5 shows an essential part of a third embodiment of the disc according to the present invention. In FIG. 5, those parts which are the same as those corresponding parts in FIG. 4 are designated by the same reference characters and letters, and their description will be omitted. In the present embodiment, the second region 10B of a disc 30 comprises track turns in which all of the three kinds of address signals $A_C$, $A_T$, and $A_P$ are recorded as they are and track turns in which the end signal is recorded in place of all of the three kinds of address signals $A_C$, $A_T$, and $A_P$. The track turns in which the end signal is recorded in place of all of the three kinds of address signals $A_C$, $A_T$, and $A_P$, occurs for every two track turns. In FIG. 5, the end signal is recorded in place of all of the three kinds of address signal $A_C$, $A_T$, and $A_P$ within each of the blanking parts $V_{B1}$ through $V_{B4}$ in the track turns t5 and t8 out of the track turns t3 through t9 within the second region 10B. The three kinds of address signals $A_C$, $A_T$, and $A_P$ are recorded as they are within each of the blanking parts $V_{B1}$ through $V_{B4}$ in the remaining track turns t3, t4, t6, t7, and t9 of the second region 10B, as in the case of the first and third regions 10A and 10C.

When the disc 30 is played on the disc reproducing apparatus which is not coupled to the external device, the end signal will be detected when the reproducing element scans over the track turn t5 (t8), regardless of which kind of address signal the disc reproducing apparatus is set to detect.

On the other hand, when the disc 30 is played on the disc reproducing apparatus which is coupled to the external device, the data related to the existing range of the second region 10B on the disc 30 and the data related to the track turns in which the end signal is recorded in place of all of the three kinds of address signal $A_C$, $A_T$, and $A_P$ are reproduced from the disc 30 and are stored within the external device. The external device controls the scanning locus of the reproducing element based on the data stored in the external device, so that the end signal will not be detected in the disc reproducing apparatus. In the present embodiment, the external device controls the reproducing element to kick by two track turns at each of kicking positions K1 and K2 shown in FIG. 5, for example, so as to prevent the detection of the end signal.

The track turns in which the end signal is recorded in place of all of the three kinds of address signals $A_C$, $A_T$, and $A_P$ do not need to be provided regularly as shown in FIG. 5, but these track turns may also be provided at random.

Figure 6:
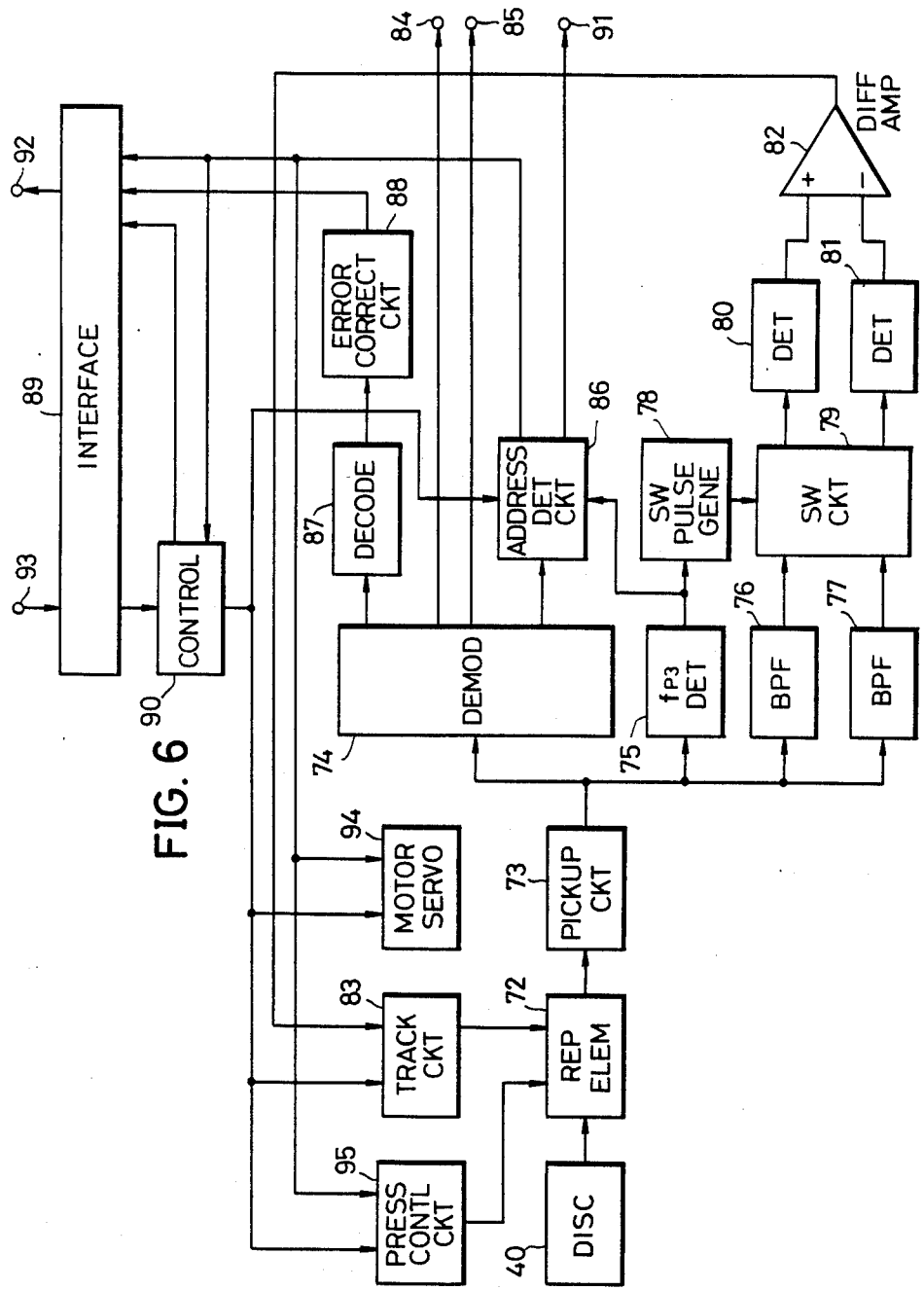
FIG. 6 is a system block diagram showing an embodiment of the disc reproducing apparatus according to the present invention.

Next, a description will be given with respect to an embodiment of the disc reproducing apparatus according to the present invention. FIG. 6 is a system block diagram showing the embodiment of the disc reproducing apparatus according to the present invention, and FIG. 7 is a plan view showing an example of the general mechanisms of the disc reproducing apparatus. In FIGS. 6 and 7, a disc 40 is recorded with information signals and the end signal, as in the case of the discs 20 and 30 shown in FIGS. 4 and 5. Further, the disc 40 is recorded with a control program signal as in the case of the previously proposed disc described before. It will be assumed that first and second reference signals fp1 and fp2 for tracking control and a third reference signal fp3 are also recorded on the disc 40. The reference signals fp1 and fp2 are recorded at intermediate positions between mutually adjacent tracks, and the sides on which the reference signals fp1 and fp2 are recorded with respect to the track changes for each revolution of the disc 40. The reference signal fp3 is recorded at a position where the sides on which the reference signals fp1 and fp2 are recorded with respect to the track change.

Because the example of the general mechanisms of the disc reproducing apparatus shown in FIG. 7 is known, only a brief description will be given in conjunction with FIG. 7. The disc 40 is placed on a turntable 50 and is clamped by a clamper 51. The disc 40 is rotated clockwise at a predetermined rotational speed. A signal pickup device 52 comprises a cartridge 55 including a cantilever 54 having a reproducing stylus 53 at a tip end thereof, a coaxial resonator 56 and the like. The signal pickup device 52 is mounted on a carriage 57. The carriage 57 comprises grooved rollers 58a and 58b on one flange thereof and a roller 59 on another flange thereof. A projection 60 of the carriage 57 is fixed to a belt 62 which is stretched across pulleys 61a and 61b. The pulley 61a is rotated by a feed motor 63 by way of a gear mechanism 64. Due to the rotation of the feed motor 63, the rollers 58a and 58b roll over a rail 66a provided on a chassis 65, and the roller 59 rolls over a rail 66b. Hence, the carriage 57 moves in the directions of arrows Y1 and Y2. In FIG. 7, the reproducing stylus 53 is shown in the rest position thereof.

Next, a description will be given with respect to the signal reproducing system of the disc reproducing apparatus, by referring to FIG. 6. The signal recorded on the disc 40 is reproduced from the disc 40 by a pickup reproducing element 72 as variations in electrostatic capacitance when the disc 40 is an electrostatic capacitance type disc, and as variation in intensity of light when the disc 40 is an optical type disc. When it is assumed that the disc 40 is an electrostatic capacitance type disc and that the reproducing element 72 is the reproducing stylus 53 shown in FIG. 7, a pickup circuit 73 comprises a resonance circuit having a resonance frequency thereof varied responsive to the variations in the electrostatic capacitance formed between an electrode of the reproducing element 72 and the disc 40, a circuit for applying to the resonance circuit a high-frequency signal having an amplitude which varies responsive to the variations in the electrostatic capacitance, and a circuit for pre-amplifying a high-frequency signal (reproduced signal) which is amplitude-detected. The high-frequency reproduced signal from the pickup circuit 73 is supplied to a demodulating circuit 74 wherein the signal is frequency-demodulated into a main information signal (in this case, the video and audio signals and the modulated signal obtained by the modulation of the control program). The output signal of the pickup circuit 73 is also supplied to an fp3 detector 75 and bandpass filters 76 and 77.

The detector 75 frequency-selects the reference signal fp3 from the reproduced signal, and supplies to a switching pulse generator 78 an fp3 detection signal which is in phase synchronism with the detected reference signal fp3. The bandpass filter 76 frequency-selects the reference signal fp1 from the reproduced signal and supplies the reference signal fp1 to a switching circuit 79. On the other hand, the bandpass filter 77 frequency-selects the reference signal fp2 from the reproduced signal and supplies the reference signal fp2 to the switching circuit 79. The switching circuit 79 is switched responsive to a switching pulse generated from the switching pulse generator 78. For example, the switching circuit 79 supplies the output reference signal fp1 of the bandpass filter 76 to a detector 80 and supplies the output reference signal fp2 of the bandpass filter 77 to a detector 81 during a high-level period of the switching pulse, and supplies the output reference signal fp1 of the bandpass filter 76 to the detector 81 and supplies the output reference signal fp2 of the bandpass filter 77 to the detector 80 during a low-level period of the switching pulse.

As a result, an envelope detection signal of the reference signal which is reproduced from a reference signal track on the outer peripheral side of the disc with respect to the information signal track is obtained from the detector 80. On the other hand, an envelope detection signal of the reference signal which is reproduced from a reference signal track on the inner peripheral side of the disc with respect to the information signal track is obtained from the detector 81. Outputs of the detectors 80 and 81 are supplied to a differential amplifier 82. A tracking error signal having a polarity in accordance with the direction of the tracking error and having a level in accordance with the tracking error quantity, is produced from the differential amplifier 82. The tracking error signal is converted into a predetermined driving voltage in a tracking circuit 83 which includes a driving circuit and the like, and the predetermined driving voltage is applied to a tracking coil (not shown). As a result, the reproducing element 72 is displaced in a direction by a quantity so as to compensate for the tracking error in the radial direction of the disc 40.

On the other hand, the video signal within the information signal demodulated in the demodulating circuit 74, is produced through an output terminal 84. The frequency modulated audio signal within the information signal demodulated in the demodulating circuit 74 is produced through an output terminal 85. The three kinds of address signals $A_C$, $A_T$, and $A_P$ within the reproduced video signal, which are multiplexed in a predetermined time period within the vertical blanking period, are all reproduced in an address detecting circuit 86. However, only one kind of address signal is detected in the address detecting circuit 86. The kind of address signal to be detected in the address detecting circuit 86 is designated by an operation controller 90. The modulated signal within the demodulated information signal is supplied to a decoder 87 wherein the modulated signal is demodulated into a reproduced control program signal. The decoder 87 is also supplied with a reproduced composite synchronizing signal which is separated from the reproduced video signal. The decoder 87 may be constituted by digital circuits or by a microcomputer. However, the construction of the decoder 87 is not directly related to the subject matter of the present invention, and detailed description on the decoder 87 will be omitted.

A reproduced control program signal which is obtained from the decoder 87, is a non return to zero (NRZ) signal. This reproduced control program signal is suppied to an error correcting circuit 88 wherein the errors are detected and corrected according to a known error correction method. An output signal of the error correcting circuit 88 is supplied to an interface circuit 89. On the other hand, the one kind of address signal which is detected and produced from the address detecting circuit 86, is constantly supplied to the interface circuit 89, the operation controller 90, and an output terminal 91. The operation controller 90 generates according to a known method a 25-bit status signal, for example, based on the data supplied thereto. The status signal indicates the contents of the inforamtion signal recorded on the disc 40 (for example, the television system of the video signal, the kind of audio signal and the like), the side of the disc 40 which is being played, the display mode, the information related to the position of the reproducing element 72, the playing mode and the like. The status signal from the operation controller 90 is supplied to the interface circuit 89.

Figure 8:
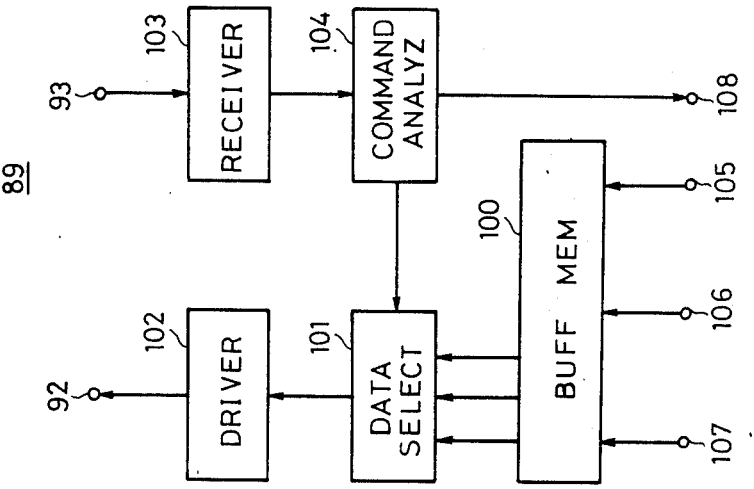
FIG. 8 is a system block diagram showing an embodiment of an interface circuit within the block system shown in FIG. 6.

FIG. 8 shows an embodiment of the interface circuit 89. The interface circuit 89 comprises a buffer memory 100, a data selector 101, a driver 102, a receiver 103, and a command analyzer 104. The address data of the reproduced address signal obtained from the address detecting circuit 86 is applied to an input terminal 105, and the program data of the reproduced control program signal obtained from the error correcting circuit 88 is applied to an input terminal 106. The status signal obtained from the operation controller 90 is applied to an input terminal 107. The three kinds of data applied to the input terminals 105 through 107 are temporarily stored in the buffer memory 100 so as to transmit these data at a predetermined transmission speed and are then supplied to the data selector 101. The data selector 101 selectively supplies only one kind of data to the external device such as the microcomputer which is not shown, through the driver 102 and an output terminal 92, based on a transmission request signal from the command analyzer 104. The command analyzer 104 within the interface circuit 89 produces a transmission request signal for requesting the disc reproducing apparatus to successively supply the program data of the reproduced control program signal to the external device through the output terminal 92, unless a command is received from the external device instructing to prohibit such a supply of the program data.

The external device is loaded with a control program interpreter in advance. The data received through the output terminal 92 is translated into a language suited for the external device by use of the control program interpreter, and input and output commands and internal processing commands of the external device are obtained. Accordingly, in the case where the data received by the external device is the program data, the external device executes the program and supplies a control command to the disc reproducing apparatus according to the needs. The control command is received through an inlet terminal 93 and is supplied to the receiver 103 within the interface circuit 89. The control command supplied to the receiver 103 is further supplied to the command analyzer 104. The command analyzer 104 discriminates whether the control command supplied thereto is a transmission request command, an output switch command, a search command, or a speed change command. When the transmission request command is supplied to the command analyzer 104, the command analyzer 104 discriminates whether the transmission request is for the address data, the status data, or the program data. The command analyzer 104 generates a transmission request signal in accordance with the discriminated transmission request, and supplies the transmission request signal to the data selector 101 within the interface circuit 89.

When the output switch command, the search command, or the speed change command is supplied to the command analyzer 104, the command analyzer 104 generates a signal in accordance with the command supplied thereto, and supplies the signal to the operation controller 90 through an output terminal 108. In the case where the search command is supplied to the operation controller 90, the operation controller 90 enters from the address detecting circuit 86 only the reproduced address signal of the kind in accordance with the kind of search designated from among the chapter search, the time search, and page (track) search (for example, the chapter address signal $A_C$ in the case where the chapter search is designated). The operation controller 90 supplies a signal to a motor servo circuit 94 so as to rotate the feed motor 63 at a speed and in a direction in accordance with the difference between the value of the one kind of reproduced address signal entered into the operation controller 90 and a desired address signal. In addition, the operation controller 90 supplies a signal to the tracking circuit 83 so as to make the tracking operation on and off. Moreover, in the case where the reproducing element 72 is the reproducing stylus 53, the operation controller 90 also supplies a signal to a stylus pressure control circuit 95 which controls the reproducing stylus 53 to make sliding contact with the disc 40.

In the case where the speed change command is supplied to the operation controller 90, the operation controller 90 supplies a control signal to the motor servo circuit 94 and the like based on an instruction signal from the interface circuit 89, so as to move the reproducing element 72 in the instructed direction with the instructed speed. The output switch command instructs reproduction of one of or both the two channels of audio signals, the muting of the video signal and the like. The command is transmitted in the manner described heretofore between the disc reproducing apparatus and the external device, and the disc 40 can be played in the interactive mode.

When the address signals are recorded on the disc 40 with the pattern shown in FIG. 4, the reproducing element 72 starts to scan over the second region 10B after scanning over the first region 10A. According to the control program signal reproduced from the first region 10A, the external device performs the operations in accordance with the flow chart shown in FIG. 9 while scanning over the second region 10B. In a step 111 shown in FIG. 9, the external device instructs the disc reproducing apparatus to supply the data when detected, and a step 112 discriminates wheter the data has been received from the disc reproducing apparatus. The data received from the disc reproducing apparatus determines the timing with which the kind of address signal to be detected in the address detecting circuit 86 should be switched, and this data is recorded on the disc 40. However, it is not essential for this data to be recorded on the disc 40, and for example, the switching timing may be obtained by use of a built-in timer of the external device. In either case, the switching timing must take into account the time delay from the time when the data is detected until the time when the command concerning the switching of the kind of address signal to be detected is actually executed. When the above data is received from the disc reproducing apparatus to detect the designated kind of address signal.

A step 114 supplies a control command to the interface circuit 89 requesting the supply of the address signal, and a step 115 receives the designated kind of reproduced address signal. A step 116 discriminates whether the value of the received address signal is greater than or equal to the address value indicating the end of the second region 10B. The steps 111 through 115 are repeated until the value of the received address signal becomes greater than or equal to the address value indicating the end of the second region 10B. As a result, the disc reproducing apparatus completes playing the second region 10B of the disc 40 without detecting the end signal, and the disc reproducing apparatus then continues to play the third region 10C of the disc 40.

When the disc 40 is recorded as shown in FIG. 4, the switching of the kind of address signal to be detected takes place at the switching positions indicated by black triangular marks in FIG. 4. In FIG. 4, a reference character $d_C$ beside the black triangular mark indicates that the kind of address signal to be detected is to be switched to the chapter address signal $A_C$. Similarly, reference characters $d_T$ and $d_P$ beside the black triangular mark indicates that the kind of address signal to be detected is to be switched to the time address signal $A_T$ and the page address signal $A_P$, respectively. A reference character $d_{CTP}$ indicates that any of the three kinds of address signals $A_C$, $A_T$, and $A_P$ may be detected. The contents of the address signals which are not detected, are neglected. In FIG. 4, the data concerning the switching timing with which the kind of address signal to be detected should be switched, is recorded at positions D1, D2, and D3, for example.

When playing the disc shown in FIG. 4, the reproducing element 72 is not kicked, but continuously scans the track turns counterclockwise, and the second region 10B is played in accordance with the operations shown in FIG. 9. In FIG. 4, when the data D1, D2, or D3 is detected at a position A, the actual switching which is performed to switch the kind of address signal to be detected occurs at the position indicated by the black triangular mark (position B) due to the time delay caused by the transmission time of the command between the disc reproducing apparatus and the external device. However, no problems will be introduced by such a time delay from the detection at the position A and the actual switching at the position B.

When the disc reproducing apparatus completes playing the second region 10B and also the third region 10C, the reproducing element 72 scans over the track turn (t11) in which the end signal is recorded in place of all of the three kinds of address signals $A_C$, $A_T$, and $A_P$. Thus, the end signal is always detected after playing the third region 10C regardless of which kind of address signal the disc reproducing apparatus is set to detect. In this case, the address detecting circuit 86 detects the end signal and supplies the detected end signal to the operation controller 90. When the end signal is supplied to the operation controller 90, the operation controller 90 supplies signals to the motor servo circuit 94 and the stylus pressure control circuit 95 so as to immediately stop the reproducing operation. In other words, the reproducing element 72, that is, the reporducing stylus 53 is automatically returned from the playing position to the rest position shown in FIG. 7. The operation of automatically returning the reproducing element 72 from the playing position to the rest position is peculiar to the disc reproducing apparatus, and the external device is not involved in this operation.

Next, in the case where the disc 40 is recorded as shown in FIG. 5, the external device (and the operation controller 90) performs the operations in accordance with the flow chart shown in FIG. 10 based on the control program signal reproduced from the first region 10A. In FIG. 10, the external device instructs the disc reproducing apparatus to perform a kick operation. A step 121 sets the kicking position (address) where the reproducing element 72 is to be kicked, and the number of track turns (two track turns in the case of the disc shown in FIG. 5) over which the reproducing element 72 is to be kicked. A signal from the interface circuit 89 is supplied to the operation controller 90 and a step 122 discriminates whether the value of the reproduced address signal is greater than or equal to the address value indicative of the kicking position. When the discrimination result in the step 122 is YES, a step 123 instructs the disc reproducing apparatus to kick the reproducing element 72 by two track turns in the inner peripheral direction of the disc 40. The steps 122 and 123 encircled by a phantom line in FIG. 10 represent the operations performed in the operation controller 90. Then, a step 124 requests the supply of the reproduced address signal with respect to the interface circuit 89, and a step 125 receives the reproduced address signal. The data related to the end position of the second region 10B is stored within the external device, and thus, the steps 121 through 125 are repeated until it is discriminated in a step 126 that the value of the reproduced address signal has become greater than or equal to the value indicating the end of the second region 10B.

Therefore, the reproducing element 72 scans over the track turns within the second region 10B avoiding the track turns which are recorded with the end signal and occur for every two track turns. Hence, the end signal will not be detected, and the disc reproducing apparatus can complete playing the second region 10B and continue to play the third region 10C.

In FIG. 5, when the reproduced address coincides with the address value indicative of the position where the reproducing element 72 is to be kicked at a position C, the reproducing element 72 is actually kicked at the kicking positions K1 and K2 (position D) due to the time delay caused by the transmission time of the command between the disc reproducing apparatus and the external device. However, no problems will be introduced by such a time delay from the coincidence reached at the position C and the actual kicking at the position D.

Next, a description will be given with respect to a concrete example of the game program and the operation of the disc reproducing apparatus when playing the game. It will be assumed that the disc 40 is recorded with nine groups of scenes which are obtained by actually taking pictures while moving a camera in a sequence of courses ①→②→...→⑨ within a maze which is shown in a plan view in FIG. 11. When the spiral or concentric tracks on the disc 40 are illustrated linerally in terms of the recorded information, the tracks can be represented by a video track 130, and two channels of audio tracks 131a and 131b as shown in FIG. 12. Portions ① through ⑨ of the video track 130 correspond to the groups of scenes obtained by moving the camera along the courses ① through ⑨ within the maze shown in FIG. 11. Portions 133 and 134 indicated by the hatchings represent regions in which the end signal is recorded in a predetermined time period within the vertical blanking period of the video signal. In other words, the regions in which the end signal is recorded are provided at a position prior to the groups of scenes related to the course ① including the entrance of the maze and subsequent to the groups of scenes related to the course ⑨ including the exit of the maze. The control program signal described before is recorded in the second channel audio track 131b at a position prior to the start of the group of scenes related to the course ①, as shown by a wide arrow in FIG. 12. In FIG. 12, a block 132 indicates the operations of the disc reproducing apparatus and the external device such as the microcomputer.

Figure 11:
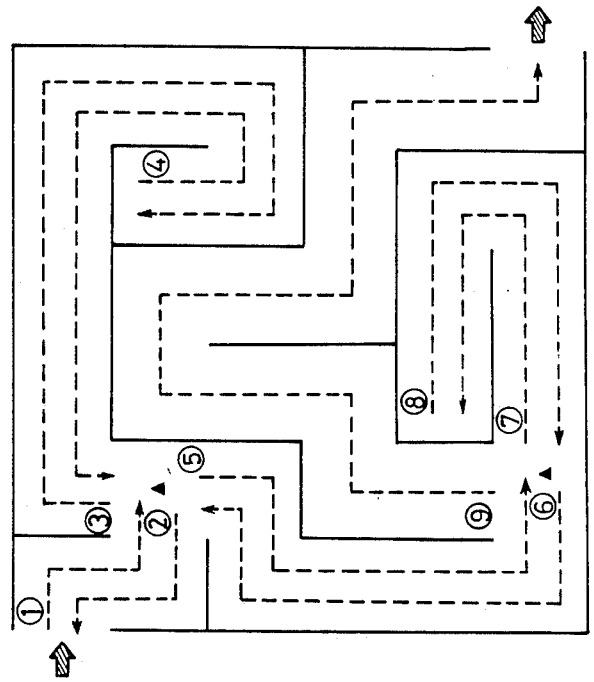
FIG. 11 is a diagram for explaining a game program recorded on the disc according to the present invention.

According to the disc 40 which is recorded with the game program described above, the player selects the course he wishes to take by entering his selection through the external device every time a fork within the maze shown in FIG. 11 is reached, which fork is indicated by a black triangular mark. In other words, the player must quickly and accurately find his way out of the maze according to this game. The keys on the disc reproducing apparatus are disabled (locked) by the command from the external device, and it is impossible to perform an operation which is not instructed by the external device. That is, it is impossible to perform a search of the scenes related to the courses ① through ⑨. Further, when the disc reproducing apparatus which plays the disc 40 is not coupled to the external device, the end signal is detected as the reproducing element scans over the portion 133 of the video track 130, and thus, it is impossible to reproduce the scenes related to the course ① and the courses which follow. Accordingly, it is impossible to successively reproduce the scenes related to the courses ① through ⑨, and it is impossible to gain knowledge of the way through the maze.

On the other hand, when the disc reproducing apparatus which plays the disc 40 is coupled to the external device, the control program signal is reproduced from the portion of the second audio track 131b and is loaded into the external device. While the control program signal is being loaded into the external device, instructions and rules on how to play the game, for example, can be displayed on the monitor. When the loading of the control program signal into the external device is completed, the execution of the program is started, and the disc reproducing apparatus plays the portion 133 so as not to detect the end signal as described before under the control of the external device. The disc reproducing apparatus then starts to play the portion ① of the video track 130. Every time the fork in the maze is reached, the disc reproducing apparatus assumes a pause mode (still mode) as indicated within the block 132 shown in FIG. 12, responsive to the command from the external device. Hence, a course is selected based on the input request to the external device. In the block 132 shown in FIG. 12, the letters "L", "R", and "S" indicate that a course to the left, a course to the right, and a course extending straight forward are selected, respectively. In addition, the circled number following the arrow indicates that a search is made to reproduce the scene related to the course of the same number.

For example, when the player selects a course to the left with respect to the input request which is obtained when the reproduction of the scenes related to the course ① is completed, the reproducing element of the disc reproducing apparatus is moved to the track position where the scenes related to the course ③ start, based on the control command from the external device. Accordingly, the selected course is displayed on the monitor. Similarly thereafter, when the reproduction of the scenes related to the course ⑨ is completed, the portion 134 is played. However, it is impossible to play the portion 134 without detecting the end signal, and the reproducing element is automatically returned from the playing position to the rest position.

The control program signal need not be recorded on the disc, and for example, the control program may be entered into the external device from another external device which pre-stores the control program signal.

Further, the present invention is not limited to these embodiments, but various variations and modifications may be made without departing from the scope of the present invention.

What is claimed is

1. An information signal recording disc playable on a disc reproducing apparatus which comprises a reproducing element for reproducing recorded signals from track turns of the information signal recording disc, said reproducing element reproducing the recorded signals from the track turns of the information signal recording disc in a playing position and stopping the reproduction in a rest position, said information signal recording disc comprising:

a first region comprising track turns recorded with an information signal at least including a video signal;

a second region comprising track turns intermittently recorded with an end signal, said end signal being used to forcibly and automatically return the reproducing element of the disc reproducing apparatus from the playing position to the rest position, said second region being provided at a position prior to said first region in a direction of a reproducing sequence of the recorded signals on the information signal recording disc; and a third region made up of at least one track turn, said third region being provided at a position subsequent to a position where the recording of the information signal terminates in the direction of the reproducing sequence of the recorded signals on the information signal recording disc, said track turns being recorded with an address signal with a constant period, said address signal indicating the position on the information signal recording disc, said end signal being recorded in place of said address signal in predetermined track turns within said second region, said end signal being recorded in place of said address signal in all track turns within said third region.

2. An information signal recording disc as claimed in claim 1 in which said first region is provided at a plurality of positions on the information signal recording disc, and said second region is provided prior to each of the plurality of first regions in the direction of the reproducing sequence of the recorded signals on the information signal recording disc.

3. An information signal recording disc as claimed in claim 1 in which said predetermined track turns exist regularly within said second region.

4. An information signal recording disc as claimed in claim 1 in which said predetermined track turns exist at random within said second region.

5. An information signal recording disc as claimed in claim 1 in which said address signal comprises three kinds of address signals, and said end signal has a signal format identical to a signal format of said three kinds of address signals, said end signal being recorded in place of at least one kind of address signal among said three kinds of address signals in said predetermined track turns within said second region.

6. An information signal recording disc as claimed in claim 5 in which at least one kind of address signal among said three kinds of address signals is recorded without being replaced by said end signal in each track turn within said second region.

7. An information signal recording disc as claimed in claim 1 in which said end signal is recorded in place of all of said three kinds of address signals in said third region.

8. An information signal recording disc as claimed in claim 1 which further comprises track turns recorded with data related to the existing range of said second region on said information signal recording disc and data related to positions on said information signal recording disc where said end signal is recorded in place of said address signal.

9. A disc reproducing apparatus for playing an information signal recording disc, said information signal recording disc comprising a first region having track turns recorded with an information signal at least including a video signal, a second region having track turns intermittently recorded with an end signal, and a third region having at least one track turn, said second region being provided at a position prior to said first region in a direction of a reproducing sequence of the recorded signals on the information signal recording disc, said third region being provided at a position subsequent to a position where the recording of the information signal terminates in the direction of the reproducing sequence of the recorded signals on the information signal recording disc, said track turns being recorded with an address signal with a constant period, said address signal indicating the position on the information signal recording disc, said end signal being recorded in place of said address signal in predetermined track turns within said second region, said end signal being recorded in place of said address signal in all track turns within said third region, said information signal recording disc being recorded with data related to the existing range of said second region on said information signal recording disc and data related to positions on said information signal recording disc where said end signal is recorded, said disc reproducing apparatus comprising:

a reproducing element for reproducing the recorded signals from said information signal recording disc;

moving means for moving said reproducing element between a rest position and a playing position;

detecting means for detecting said end signal from the reproduced signal from said reproducing element;

interface means for transmitting information between said disc reproducing apparatus and an external device which can be coupled to said disc reproducing apparatus, said external device having a discriminating function, said interface means supplying to said external device at least said data within the reproduced signal and receiving a control command from said external device when said external device is coupled to said disc reproducing apparatus; and controller means responsive to the control command from said interface means for controlling operations of said moving means and said detecting means, said controller means controlling the operation of said moving means responsive to the end signal detected in said detecting means, said controller means making said detecting means operative when said external device is not coupled to said disc reproducing apparatus, so that said moving means is controlled to return said reproducing element from the playing position to the rest position when said detecting means detects the end signal, said controller means making said detecting means substantially inoperative responsive to said control command when said external device is coupled to said disc reproducing apparatus, so that said reproducing element can scan through said second recording region and reach said first recording region.

10. A disc reproducing apparatus as claimed in claim 9, in which said detecting means constantly detects only one kind of address signal out of three kinds of address signals constituting said address signal, said end signal having a signal format identical to a signal format of the three kinds of address signals, said end signal being recorded in place of one or two kinds of address signals out of said three kinds of address signals in said predetermined track turns within said second region, the kind of address signal to be detected in said detecting means being controlled and switched responsive to an output signal of said controller means, said controller means controls said moving means so as to return said reproducing element from the playing position to the rest position when said detecting means detects said end signal from said predetermined track turns as said one kind of address signal to be detected therein when said external device is not coupled to said disc reproducing apparatus, and said controller means controls and switches the kind of address signal to be detected in said detecting means based on said data when said external device is coupled to said disc reproducing apparatus, so that a kind of address signal which is not replaced by the end signal is always detected in said detecting means.

11. A disc reproducing apparatus as claimed in claim 9, in which said controller means controls said moving means so as to return said reproducing element from the playing position to the rest position when said detecting means detects from said predetermined track turns the address signal which is replaced by said end signal when said external device is not coupled to said disc reproducing apparatus, and said controller means controls said moving means to kick said reproducing element from one track turn to another track turn based on said control command and said data, so that said reproducing element does not scan over said predetermined track turns and said detecting means detects only the address signal which is not replaced by said end signal.

* * * * *